June 10, 1930.   C. E. MAYNARD   1,762,833
GUIDE FOR PNEUMATIC TIRE TREADS
Filed Oct. 24, 1927
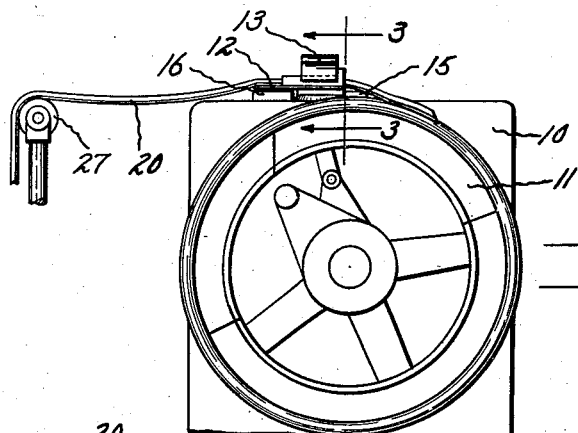
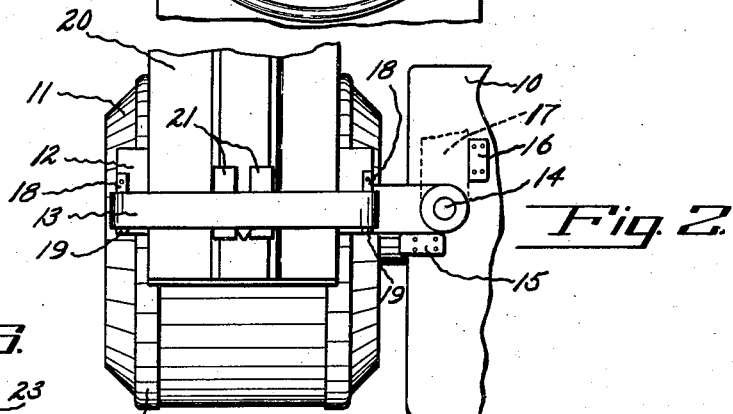
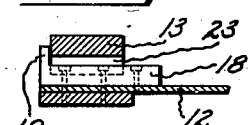
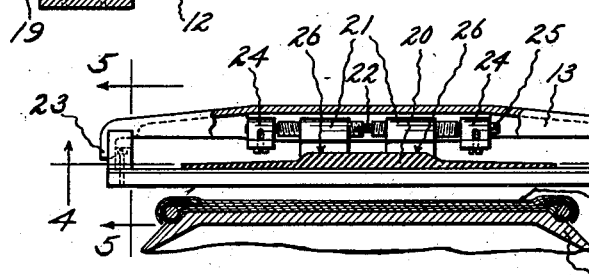
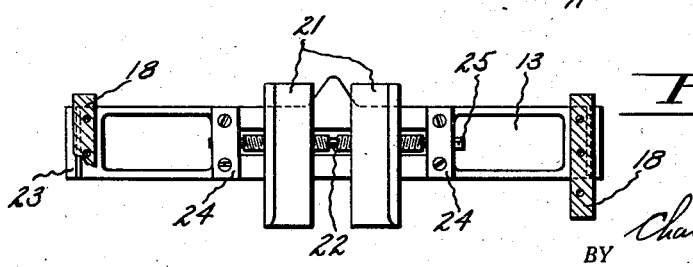
INVENTOR.
Charles Edgar Maynard
BY Edward C. Taylor
ATTORNEY.

Patented June 10, 1930

1,762,833

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

GUIDE FOR PNEUMATIC TIRE TREADS

Application filed October 24, 1927. Serial No. 228,153.

In the manufacture of pneumatic tires difficulty is often found in centralizing the tread portion of the tire upon the tire carcass. Guiding means of various types have been provided whereby the tread is led onto the carcass by having the edge portions of the tread run along or over the guides. This means of guiding, as a rule, has proved unsatisfactory because the ordinarily thin edge of the tread stretches, wrinkles, or pulls over the guides. This is especially noticeable when the sidewalls and the tread of the tire are calendered in one piece.

The object of my invention is to provide a guide for the tread of a pneumatic tire whereby a proportionally heavy section in the center of the tread is used in conjunction with my guide for centralizing the tread smoothly over a tire carcass. Another object is to provide a guide that will stretch a tread at its heavy center section as it is drawn onto a tire carcass.

In the drawings I have shown a guide made in accordance with my invention, adapted to be used on a machine of the type known as a flat band tire building machine. However, I do not limit myself to guides for this type of machine as with but slight alteration, in which the principle of the invention is not changed, these guides could be adapted for use with other tire machines.

Referring to the drawings,

Fig. 1 is a side elevation of a tire building machine, partially broken away, showing the location of a guide on the machine;

Fig. 2 is a plan view of Fig. 1;

Fig. 3 is a view, partly in section, taken on line 3—3 of Fig. 1;

Fig. 4 is a view taken substantially on line 4—4 of Fig. 3; and

Fig. 5 is a view taken on line 5—5 of Fig. 3.

In the drawings, a tire building machine 10 having a collapsible drum 11 is shown equipped with a device embodying my invention. The device is made up of two separate units, a shelf 12 and a guiding unit 13. The shelf 12, pivoted at 14 to the machine 10 and projecting over the drum 11 when being used, is adapted to swing out of its operative position in which it lies against a stop 15 into an inoperative position against a stop 16, as indicated by dotted lines at 17. The shelf 12 has on its sides at equal distances from the center of the drum 11 a pair of bars 18 with projections 19 adapted to align the guiding unit 13 squarely over the shelf.

The other part of the device, the guiding unit 13, is adapted to fit over the bars 18 and a tire tread 20 being drawn over the shelf 11. A pair of members 21 on the guiding unit 13 are threaded to an adjusting screw 22 at equal distances from the center of the unit. The center of the unit is located just above the center of the building drum 11 due to a pair of downturning flanges 23 on the unit fitting over the bars 18. The screw 22 is housed in bearings 24 at each end, a projection 25 through one bearing being milled to provide means whereby the screw may be turned. This screw has on one side of its center portion a left hand thread and on the other side a right hand thread causing the members 21 to either move simultaneously toward or away from each other when the screw is turned. The members 21 will therefore always be at equal distances from the center of the unit enabling the use of the device for treads of various widths. These members are formed on their guiding surfaces 26 to the contour of the heavy portion of the tread.

In operation, the shelf 12 is pivoted from its inoperative position against the stop 16 around to the stop 15. The tread is laid over the shelf and over a convenient supporting roll 27. The guide unit 13 is placed on the tread so that flanges 23 on the unit will fit over the bars 18 and against the projections 19. The unit is now centralized in relation to the drum 11 on which a tire carcass 28 has already been built. As the unit 13 does not rest directly on the shelf 12 but is only guided by the flanges 23 and the bars 18 to prevent sideward motion of the unit the tire builder may press down on the unit, thus pressing the thread 20 to the shelf. As the tread now is drawn off the shelf 12 onto the carcass 28 it will be stretched at its heavy center portion due to the pressure given the guide unit 13 by the operator. This will cause the tread to lie smoothly and centrally on the carcass without any undue stretching and wrinkling of the thin side portions of the tread.

Having thus described my invention, I claim:

1. In a tire building machine, a device for centralizing a tire tread on a tire carcass comprising in combination a shelf projecting over the tire carcass and an adjustable guide pressing a tire tread on the shelf as the said tread slides over it.

2. In a tire building machine, a tread guiding device presenting a confined guiding passage for the shouldered central portion of a tread and an unconfined support for the outstanding relatively thin sides of the tread.

3. In a tire building machine, a tread guiding device presenting a confined guiding passage for the shouldered central portion of a tread, the passage being contractible in a direction normal to the tread surface for exerting tension to the tread.

4. In a tire building machine, a tread guiding device presenting a confined guiding passage for the shouldered central portion of a tread, the passage being contractible in a direction normal to the tread surface for exerting tension to the tread, and an unconfined support for the outstanding relatively thin sides of the tread.

5. In a tire building machine, a tread guiding device presenting a flat surface over which a tread may pass and guiding surfaces acting upon intermediate shoulders of the tread.

6. In a tire building machine a device for guiding a tire tread centrally and smoothly over a tire carcass on the machine consisting of a shelf centralized over the tire carcass and a guiding unit fitting centrally on the shelf and adapted to have a tire tread pass between the said guiding unit and the shelf.

CHARLES EDGAR MAYNARD.